(12) United States Patent
Wang et al.

(10) Patent No.: US 10,166,787 B2
(45) Date of Patent: Jan. 1, 2019

(54) PRINTER AND CONTROL METHOD THEREFOR

(71) Applicant: Shandong New Beiyang Information Technology Co., Ltd., Shandong (CN)

(72) Inventors: Xin Wang, Shandong (CN); Xunpeng Wang, Shandong (CN); Shaohua Deng, Shandong (CN); Guokai Wang, Shandong (CN); Chuntao Wang, Shandong (CN)

(73) Assignee: Shandong New Beiyang Information Technology Co., Ltd., Shandong (CN)

( * ) Notice: Subject to any disclaimer, the term of this patent is extended or adjusted under 35 U.S.C. 154(b) by 0 days.

(21) Appl. No.: 15/746,623

(22) PCT Filed: Jul. 14, 2016

(86) PCT No.: PCT/CN2016/090080
§ 371 (c)(1),
(2) Date: Jan. 22, 2018

(87) PCT Pub. No.: WO2017/012504
PCT Pub. Date: Jan. 26, 2017

(65) Prior Publication Data
US 2018/0222216 A1 Aug. 9, 2018

(30) Foreign Application Priority Data

Jul. 21, 2015 (CN) .......................... 2015 1 0431789

(51) Int. Cl.
*B41J 2/525* (2006.01)
*B41J 2/325* (2006.01)
(Continued)

(52) U.S. Cl.
CPC ............. *B41J 11/008* (2013.01); *B41J 2/325* (2013.01); *B41J 2/525* (2013.01); *B41J 29/393* (2013.01);
(Continued)

(58) Field of Classification Search
CPC ........ B41J 11/008; B41J 2/325; B41J 29/393; H04N 1/6072; H04N 1/6044; H04N 1/00087; H04N 1/00037
See application file for complete search history.

(56) References Cited

FOREIGN PATENT DOCUMENTS

JP S61177260 A 8/1986
JP 61-217267 A * 9/1986 .............. B41J 35/18
(Continued)

OTHER PUBLICATIONS

Machine-generated translation of JP 61-217267, published on Sep. 1986.*

(Continued)

*Primary Examiner* — Huan Tran
(74) *Attorney, Agent, or Firm* — Wilmer Cutler Pickering Hale and Dorr LLP (57) ABSTRACT

Disclosed are a printer and a control method thereof. The control method of the printer includes: a first positioning mark and a first printing content are printed on printing paper when printing is executed using a ribbon of a reference color; and a starting position of the first page is transmitted to a printing position of a printing head according to the first positioning mark and a printing position deviation compensation value to print the printing content of the first page in an ith printing content when printing is executed using a ribbon of an ith color. The method solves a problem of inaccurate positioning in a printer when one page on printing paper is positioned repeatedly.

12 Claims, 7 Drawing Sheets

(51) Int. Cl.
    *B41J 11/00*      (2006.01)
    *B41J 29/393*     (2006.01)
    *H04N 1/00*       (2006.01)
    *H04N 1/60*       (2006.01)
(52) U.S. Cl.
    CPC ..... *H04N 1/00037* (2013.01); *H04N 1/00087* (2013.01); *H04N 1/6044* (2013.01); *H04N 1/6072* (2013.01)

(56) References Cited

FOREIGN PATENT DOCUMENTS

| JP | 63-031363 A * | 2/1988 | ............... H04N 1/23 |
| JP | 06-014667 B2 * | 2/1994 | ............... H04N 1/23 |
| JP | H07329387 A | 12/1995 | |
| JP | H0825769 A | 1/1996 | |
| JP | 2000190605 A | 7/2000 | |
| JP | 2010125791 A | 6/2010 | |
| JP | 2010173157 A | 8/2010 | |
| JP | 2010179482 A | 8/2010 | |

OTHER PUBLICATIONS

Machine-generated translation of JP 06-014667, published on Feb. 1994.*
International Search Report dated Oct. 20, 2016, in the International Application No. PCT/CN2016/090080, 6 pages.

* cited by examiner

PRINTER AND CONTROL METHOD THEREFOR

CROSS REFERENCE TO RELATED APPLICATIONS

This application is a U.S. National Stage entry of PCT International Application No. PCT/CN2016/090080 filed Jul. 14, 2016, which claims priority to Chinese Application No. 201510431789.0 filed Jul. 21, 2015, the contents of which are incorporated herein by reference in their entirety.

TECHNICAL FIELD

The present disclosure relates to the field of printing, and for example, relates to a printer and a control method thereof.

BACKGROUND

A thermal transfer printer includes a thermal printing head (hereinafter referred to as the printing head) and a roller arranged opposite to the printing head. Printing paper and a ribbon penetrate between the printing head and the roller, and the ribbon is located between the printing head and the printing paper. An ink layer of the ribbon comes into contact with the printing paper. The printing head transfers dye on the ink layer of the ribbon to the printing paper to form an image by heating the ribbon.

A related technology discloses a thermal transfer printer and a control method for printing a color page. The printer includes a driving unit and a photoelectric sensor. The driving unit drives the printing paper to move in a printing passage. When the color page is printed, a user firstly installs a ribbon of a first color (hereinafter referred to as a reference color) on the printer; the printer determines a starting position of each page on the printing paper by recording a movement distance of the printing paper, and prints a positioning mark on each page by using the ribbon of the reference color, and then uses the ribbon of the reference color to print an image of a corresponding color in the page. The user successively installs ribbons of other colors such as a second color and a third color on the printer. In a process of driving the printing paper to move by the driving unit, the printer determines whether the printed positioning mark reaches a detection position of the photoelectric sensor by comparing an electrical signal outputted by the photoelectric sensor with a preset threshold, and transmits the starting position of the page to the printing position of the printing head by driving the printing paper to move by a preset fixed distance when detecting that the positioning mark reaches the detection position of the photoelectric sensor. In the page, the currently installed ribbon is used to print the image of the corresponding color. The printer uses ribbons of multiple colors in one page to overprint the image, thereby completing the printing of the color page.

Figure 1:
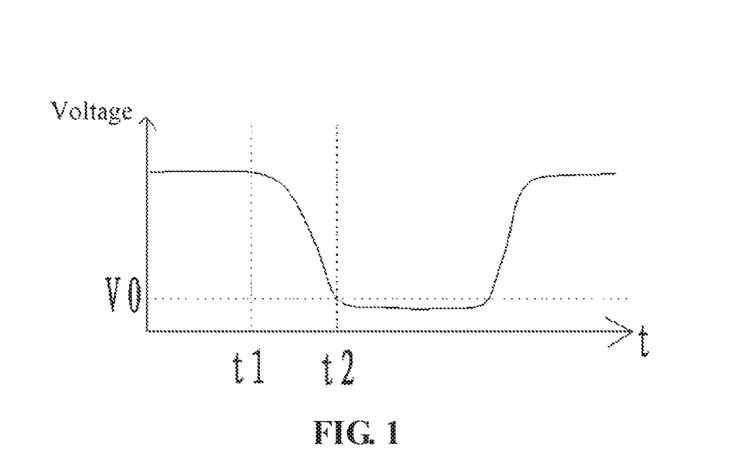
FIG. 1 is a waveform schematic diagram illustrating an electrical signal outputted by a photoelectric sensor when a positioning mark printed on printing paper passes through a photoelectric sensor disposed fixedly in a related technology.

When using the ribbons of other colors except the ribbon of the reference color to perform image overprinting, the above printer determines whether the printed positioning mark reaches the detection position of the photoelectric sensor by comparing the electrical signal outputted by the photoelectric sensor with the preset threshold. FIG. 1 is a waveform schematic diagram illustrating the electrical signal outputted by the photoelectric sensor when the positioning mark printed on the printing paper passes through the photoelectric sensor disposed fixedly, where the electrical signal outputted by the photoelectric sensor is a voltage value. The voltage value outputted by the photoelectric sensor is a low level when the positioning mark is covered on the photoelectric sensor, and the voltage value outputted by the photoelectric sensor is a high level when the positioning mark is not covered on the photoelectric sensor. As shown in the figure, at t1, a front edge of the positioning mark along a transmitting direction reaches the detection position of the photoelectric sensor, and the voltage value outputted by the photoelectric sensor starts to decrease; and at t2, the voltage value outputted by the photoelectric sensor is decreased to a preset threshold V0. At this moment, the controller of the printer determines that the positioning mark reaches the detection position of the photoelectric sensor. Since a time interval exists between the moment that the front edge of the positioning mark reaches the detection position of the photoelectric sensor and the moment that the controller of the printer determines that the positioning mark reaches the detection position of the photoelectric sensor, the front edge of the positioning mark actually already passes through the detection position of the photoelectric sensor when the controller determines that the positioning mark reaches the detection position of the photoelectric sensor.

The printer determines the starting position of each page by recording the movement distance of the printing paper when the ribbon of the reference color is installed, the printer determines the starting position of each page through the detected positioning mark when the ribbons of other colors are installed, there is a detection error when the photoelectric sensor detects the positioning mark as mentioned above. There is therefore an error between the starting position of the page determined when the ribbons of other colors are installed and the starting position of the page determined when the ribbon of the reference color is installed. This may cause that actual printing positions of an image printed by using the ribbon of the reference color and an image printed by using the ribbons of other colors are inconsistent in one page when a set image is printed in a printing position of the page by using the ribbon of the reference color and set images are printed in the printing position of the page by using the ribbons of other colors, causing inaccurate image overprinting in the color page.

In view of a problem of inaccurate image overprinting in a printer of the related technology when the color page is printed, an effective solution is not proposed at present.

SUMMARY

A main purpose of the present disclosure is to provide a printer and a control method thereof, so as to solve a problem of inaccurate positioning in a printer of a related technology when one page on printing paper is positioned repeatedly.

In a first aspect of the present disclosure, a control method of a printer is provided, including: printing a first positioning mark and a first printing content on printing paper when printing is executed using a ribbon of a reference color, wherein the first positioning mark is used for marking a position of a first page on the printing paper and the first printing content is printed by using the ribbon of the reference color; firstly detecting the first positioning mark on the printing paper and then transmitting a starting position of the first page to a printing position of a printing head according to the first positioning mark and a printing position deviation compensation value to print the printing content of the first page in an ith printing content when printing is executed using a ribbon of an ith color, wherein the printer includes a mark sensor for detecting a positioning mark on the printing paper and a printing head for executing printing on the printing paper; the printing position deviation compensation value is a distance between a starting position of the first positioning mark when the mark sensor detects that the first positioning mark reaches the detection position of the mark sensor and a detection position of the mark sensor; the ith color is a color except the reference color; and the ith printing content is printed by using the ribbon of the ith color.

Optionally, a distance between the detection position of the mark sensor and the printing position of the printing head is a first distance L1; the printing position deviation compensation value is H, wherein a step of transmitting the starting position of the first page to the printing position of the printing head according to the first positioning mark and the printing position deviation compensation value includes: detecting whether the first positioning mark reaches the detection position of the mark sensor in the transmitting process of the printing paper; and controlling the printing paper to move by a distance of L1+H along a first direction if the mark sensor detects that the first positioning mark reaches the detection position of the mark sensor, wherein the first direction is from the mark sensor to the printing head.

Optionally, a distance between the detection position of the mark sensor and the printing position of the printing head is a first distance L1; and the printing position deviation compensation value is obtained through a following printing position correcting method: printing a first mark and a correcting and positioning mark on the printing paper after the ribbon of the reference color is installed on the printer, wherein a distance between a starting position of the first mark and a starting position of the correcting and positioning mark on the printing paper is a second distance L2; detecting the correcting and positioning mark and judging whether the correcting and positioning mark reaches the detection position of the mark sensor in a feeding process of the printing paper; controlling the printing paper to move back if judging the correcting and positioning mark reaches the detection position of the mark sensor, wherein a moving distance of the printing paper is a sum of the first distance L1 and the second distance L2; printing a second mark on the printing paper; and acquiring a spacing distance between the first mark and the second mark along a printing paper transmitting direction, and using the spacing distance as the printing position deviation compensation value.

Optionally, a distance between the detection position of the mark sensor and the printing position of the printing head is a first distance L1; and the printing position deviation compensation value is obtained through a following printing position correcting method: printing a correcting and positioning mark on the printing paper when the ribbon of the reference color is installed on the printer; detecting the correcting and positioning mark and judging whether the correcting and positioning mark reaches the detection position of the mark sensor in a feeding process of the printing paper; controlling the printing paper to move back if judging the correcting and positioning mark reaches the detection position of the mark sensor, wherein a moving distance of the printing paper is the first distance L1; printing a second mark on the printing paper; and acquiring a spacing distance between the correcting and positioning mark and the second mark along a printing paper transmitting direction, and using the spacing distance as the printing position deviation compensation value.

Optionally, the printer further includes a memory for storing the printing position deviation compensation value; after the printing position deviation compensation value is obtained through the printing position correcting method, the printing position deviation compensation value is stored into the memory; when the printing position deviation compensation value is acquired, the method also includes: judging whether the installed ribbon of the reference color on the printer is changed; re-correcting through the printing position correcting method to obtain the printing position deviation compensation value if judging the installed ribbon of the reference color on the printer is changed; and reading the printing position deviation compensation value from the memory if judging the installed ribbon of the reference color on the printer is not changed.

In a second aspect of the present disclosure, a printer is provided. The printer includes: a printing head configured to execute printing on a printing paper; a printing paper driving assembly configured to drive the printing paper to move in a printing passage; a mark sensor configured to detect a positioning mark including a first positioning mark on the printing paper, wherein the first positioning mark is used for marking a position of a first page on the printing paper; and a controller configured to control the printing head to print the first positioning mark and a first printing content on the printing paper when the printing head is printing using a ribbon of a reference color, and firstly detect the first positioning mark through the mark sensor and then control the printing paper driving assembly to transmit a starting position of the first page to a printing position of the printing head according to the first positioning mark and a printing position deviation compensation value to control the printing head to print the printing content of the first page in an ith printing content when the printing head is controlled to execute printing using a ribbon of an ith color, wherein the first printing content is printed by using the ribbon of the reference color; the printing position deviation compensation value is a distance between a starting position of the first positioning mark when the mark sensor detects that the first positioning mark reaches the detection position of the mark sensor and a detection position of the mark sensor; the ith color is a color except the reference color; and the ith printing content is printed by using the ribbon of the ith color.

Optionally, a distance between the detection position of the mark sensor and the printing position of the printing head is a first distance L1; the printing position deviation compensation value is H; and the controller is configured to control the printing paper driving assembly to transmit the starting position of the first page to the printing position of the printing head according to the first positioning mark and the printing position deviation compensation value through a following method: judging whether the first positioning mark reaches the detection position of the mark sensor according to a detection signal outputted by the mark sensor in the transmitting process of the printing paper; and controlling the printing paper driving assembly to drive the printing paper to move by a distance of L1+H along a first direction if the mark sensor judges that the first positioning mark reaches the detection position of the mark sensor, wherein the first direction is from the mark sensor to the printing head.

Optionally, a distance between the detection position of the mark sensor and the printing position of the printing head is a first distance L1; and the controller is also configured to obtain the printing position deviation compensation value through a following printing position correcting method: controlling the printing head to print a first mark and a correcting and positioning mark on the printing paper after the ribbon of the reference color is installed on the printer, wherein a distance between a starting position of the first mark and a starting position of the correcting and positioning mark on the printing paper is a second distance L2; detecting the correcting and positioning mark and judging whether the correcting and positioning mark reaches the detection position of the mark sensor through the mark sensor in a feeding process of the printing paper; controlling the printing paper driving assembly to drive the printing paper to move back if judging the correcting and positioning mark reaches the detection position of the mark sensor, wherein a moving distance of the printing paper is a sum of the first distance L1 and the second distance L2; controlling the printing head to print a second mark on the printing paper; and acquiring a spacing distance between the first mark and the second mark along a printing paper transmitting direction, and using the spacing distance as the printing position deviation compensation value.

Optionally, a distance between the detection position of the mark sensor and the printing position of the printing head is a first distance L1; and the controller is also configured to obtain the printing position deviation compensation value through a following printing position correcting method: controlling the printing head to print a correcting and positioning mark on the printing paper after the ribbon of the reference color is installed on the printer; detecting the correcting and positioning mark and judging whether the correcting and positioning mark reaches the detection position of the mark sensor through the mark sensor in a feeding process of the printing paper; controlling the printing paper driving assembly to drive the printing paper to move back if judging the correcting and positioning mark reaches the detection position of the mark sensor, wherein a moving distance of the printing paper is the first distance L1; controlling the printing head to print a second mark on the printing paper; and acquiring a spacing distance between the correcting and positioning mark and the second mark along a printing paper transmitting direction, and using the spacing distance as the printing position deviation compensation value.

Optionally, the printer further includes a memory configured to store the printing position deviation compensation value obtained through the printing position correcting method; the controller is also configured to judge whether the installed ribbon of the reference color on the printer is changed, re-execute the printing position correcting method to obtain the printing position deviation compensation value if judging the installed ribbon of the reference color on the printer is changed, and read the printing position deviation compensation value from the memory if judging the installed ribbon of the reference color on the printer is not changed.

Through the present disclosure, a first positioning mark and a first printing content are printed on printing paper when printing is executed using a ribbon of a reference color, and a starting position of a first page is transmitted to a printing position of a printing head according to the first positioning mark and a printing position deviation compensation value to print the printing content of the first page in an ith printing content when printing is executed using the ribbon of an ith color, thereby solving a problem of inaccurate image overprinting in a printer of a related technology when a color page is printed and further enhancing accuracy of image overprinting when the color page is printed.

BRIEF DESCRIPTION OF DRAWINGS

Drawings which constitute a part of the description are used to provide understanding for the present disclosure.

Schematic embodiments and illustration of the present disclosure are used to explain the present disclosure, but not to form improper limitation to the present disclosure. In figures.

DETAILED DESCRIPTION

It should be noted that embodiments in the present disclosure and features in embodiments can be combined mutually without conflict. The present disclosure will be described in detail below with reference to drawings and in combination with embodiments.

Technical solutions in embodiments of the present disclosure will be clearly and fully described below in combination with drawings in embodiments of the present disclosure. Apparently, the described embodiments are merely some embodiments of the present disclosure, but are not all of the embodiments. Based on embodiments in the present disclosure, all other embodiments obtained by those ordinary skilled in the art without contributing creative labor belong to a protection scope of the present disclosure.

It should be noted that terms such as "first", "second" and the like in description, claims and above drawings of the present disclosure are used to distinguish similar objects, and are not necessarily used to describe specific sequences or precedence orders. It should be understood that data used in this way can be exchanged in proper cases so as to describe embodiments in the present disclosure herein. In addition, the terms such as "include", "have" and any variation thereof are intended to cover non-exclusive inclusion. For example, processes, methods, systems, products or devices including a series of steps or units are not necessarily limited to those steps or units clearly listed, but can include other steps or units not clearly listed or inherent for these processes, methods, products or devices.

Figure 2:
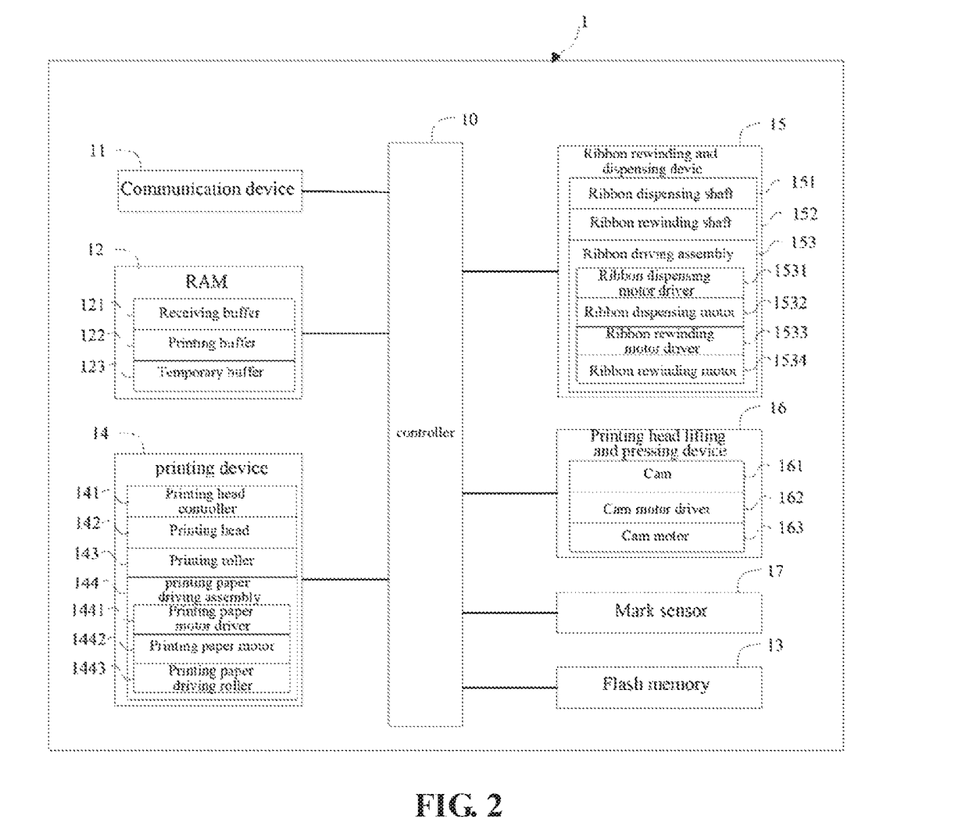
FIG. 2 is a schematic diagram illustrating a module composition of a thermal transfer printer according to a first embodiment of the present disclosure.

FIG. 2 is a schematic diagram illustrating a module composition of a thermal transfer printer according to a first embodiment of the present disclosure. As shown in the figure, the printer 1 includes a controller 10, a communication device 11, a RAM 12, a flash memory 13, a printing device 14, a ribbon rewinding and dispensing device 15, a printing head lifting and pressing device 16 and a mark sensor 17.

The controller 10 is configured to control other modules to execute operation and perform data computation and processing, for example, control the communication device 11 to execute data transmission between the printer 1 and a print requesting apparatus (e.g., a computer) and control the printing device 14 to execute image printing and the like.

The communication device 11 is configured to execute data transmission between the printer 1 and a print requesting apparatus. For example, the communication device 11 receives a printing control command and printing data sent by the print requesting apparatus.

The RAM 12 includes a receiving buffer 121, a printing buffer 122 and a temporary buffer 123. The receiving buffer 121 is configured to store the printing control command and the printing data received by the communication device 11. The printing buffer 122 is configured to store lattice data to be sent to a printing head 142 of the printing device 14, and the lattice data is generated after the controller 10 handles the printing data stored in the receiving buffer 121. The temporary buffer 123 is configured to store data and variables generated in a running process of a control program of the printer 1 temporarily. For example, the temporary buffer 123 is configured to store the printing position deviation compensation value obtained through the printing position correcting method temporarily.

The flash memory 13 is configured to store the control program of the printer 1 and fixed values needed in the running process of the program. The fixed values include a first preset threshold T1, a first distance L1 and a second distance L2. The first preset threshold T1 is used for judging whether a positioning mark on the printing paper is located in the detection position of the mark sensor 17; the first distance L1 is a distance between the detection position of the mark sensor 17 and the printing position of the printing head 142; and the second distance L2 is a distance between a starting position of a first mark and a starting position of a correcting and positioning mark on the printing paper. The flash memory 13 can also be configured to store the printing position deviation compensation value obtained through the printing position correcting method.

The printing device 14 is configured to print an image on the surface of the printing paper. The printing device 14 includes a printing head controller 141, a printing head 142, a printing roller 143 and a printing paper driving assembly 144. The printing head controller 141 is configured to output a driving signal of the printing head 142 according to a control signal outputted by the controller 10 and the lattice data stored in the printing buffer 122. The printing head 142 and the printing roller 143 are tangently disposed in a printing passage. The printing paper and the ribbon penetrate between the printing head 142 and the printing roller 143, and the ribbon is located between the printing head 142 and the printing paper. An ink layer of the ribbon comes into contact with the printing paper. The printing head 142 includes a plurality of heating bodies arranged into one line at an equal distance along a width direction of the printing paper (i.e., a direction perpendicular to a printing paper transmitting direction). The heating bodies of the printing head 142 emit heat according to a driving signal sent by the printing head controller 141, so that dye on the ink layer of the ribbon is transferred to the printing paper, thereby forming an image on the printing paper. The printing paper driving assembly 144 includes a printing paper motor driver 1441, a printing paper motor 1442 and a printing paper driving roller 1443. The printing paper motor driver 1441 is configured to supply working current to the printing paper motor 1442 according to the control signal outputted by the controller 10, so as to drive an output shaft of the printing paper motor 1442 to rotate. The output shaft of the printing paper motor 1442 is in transmission connection with the printing roller 143 and the printing paper driving roller 1443. When the output shaft of the printing paper motor 1442 rotates, the printing roller 143 and the printing paper driving roller 1443 rotate with it, thereby driving the printing paper to move in the printing passage.

The ribbon rewinding and dispensing device 15 is configured to dispense and rewind a ribbon. The ribbon rewinding and dispensing device 15 includes a ribbon dispensing shaft 151, a ribbon rewinding shaft 152 and a ribbon driving assembly 153. The ribbon dispensing shaft 151 is used for supporting an unused ribbon; and the ribbon rewinding shaft 152 is used for supporting a used ribbon. The unused ribbon is led away from the ribbon dispensing shaft 151, and is wound on the ribbon rewinding shaft 152 after penetrating between the printing head 142 and the printing roller 143. The ribbon driving assembly 153 is configured to drive the ribbon dispensing shaft 151 and/or the ribbon rewinding shaft 152 to rotate. Optionally, the ribbon driving assembly 153 includes a ribbon dispensing motor driver 1531, a ribbon dispensing motor 1532, a ribbon rewinding motor driver 1533 and a ribbon rewinding motor 1534. The ribbon dispensing motor driver 1531 is configured to supply working current to the ribbon dispensing motor 1532 according to the control signal outputted by the controller 10, so as to drive an output shaft of the ribbon dispensing motor 1532 to rotate. The output shaft of the ribbon dispensing motor 1532 and the ribbon dispensing shaft 151 are in transmission connection. When the output shaft of the ribbon dispensing motor 1532 rotates, the ribbon dispensing shaft 151 rotates with it so as to dispense the unused ribbon from the ribbon dispensing shaft 151. The ribbon rewinding motor driver 1533 is configured to supply working current to the ribbon rewinding motor 1534 according to the control signal outputted by the controller 10, so as to drive an output shaft of the ribbon rewinding motor 1534 to rotate. The output shaft of the ribbon rewinding motor 1534 and the ribbon rewinding shaft 152 are in transmission connection. When the output shaft of the ribbon rewinding motor 1534 rotates, the ribbon rewinding shaft 152 rotates with the output shaft so as to recover the used ribbon to the ribbon rewinding shaft 152.

The printing head lifting and pressing device 16 is configured to lift or press the printing head 142, so that the printing head 142 and the printing roller 143 are tangent or separated. The printing head lifting and pressing device 16 includes a cam 161, a cam motor driver 162 and a cam motor 163. The cam motor driver 162 is configured to supply working current to the cam motor 163 according to the control signal outputted by the controller 10, so as to drive an output shaft of the cam motor 163 to rotate. An output shaft of the cam motor 163 and the cam 161 are in transmission connection. The cam 161 is matched with a fixing plate of the printing head 142. The cam motor 163 drives the cam 161 to rotate by different set angles, so that the printing head 142 is located in a lifted or pressed position.

The mark sensor 17, which is a reflection sensor or a transmission sensor, is configured to detect whether a mark part of the printing paper reaches the detection position of the mark sensor 17. In the present embodiment, the mark sensor 17 is the reflection sensor and includes an optical generator and an optical receiver. The optical generator and the optical receiver are arranged in the printing passage and are electrically connected with the controller 10. Under the effect of driving current supplied by the controller 10, the optical generator emits light rays with certain intensity. The light rays are received by the optical receiver after reflected by the mark part of the printing paper or a non-mark part of the printing paper. The optical receiver converts a received optical signal into an electrical signal, and transmits the electrical signal to the controller 10. Since the reflectivity of the mark part of the printing paper is different from that of the non-mark part of the printing paper, when the light emitted by the optical generator is irradiated on the mark part or the non-mark part of the printing paper, the optical receiver receives different optical intensities and outputs different detection signals to the controller 10. For example, the optical receiver of the mark sensor 17 outputs a first detection signal when the mark part of the printing paper is located in the detection position of the mark sensor 17, and the optical receiver of the mark sensor 17 outputs a second detection signal when the non-mark part of the printing paper is located in the detection position of the mark sensor 17. When the controller 10 judges that the detection signal outputted by the optical receiver of the mark sensor 17 is changed from the second detection signal to the first detection signal, it is judged that the mark part of the printing paper reaches the detection position of the mark sensor 17.

Figure 3:
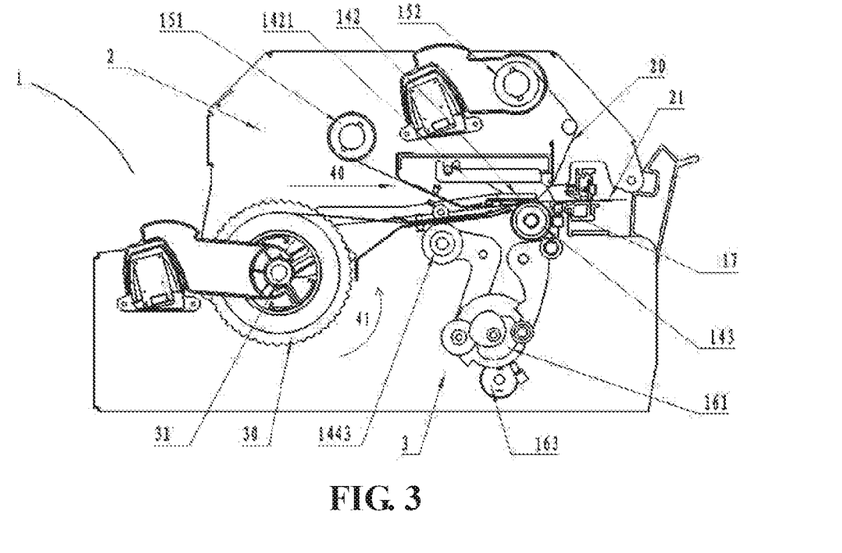
FIG. 3 is a structural schematic diagram illustrating a thermal transfer printer according to the first embodiment of the present disclosure.

FIG. 3 is a structural schematic diagram illustrating a thermal transfer printer according to a first embodiment of the present disclosure. As shown in the figure, the printer includes a ribbon bracket 2 and a base 3. The ribbon bracket 2 is pivoted with the base 3, and can be opened or closed relative to the base 3. The printing head 142 of the printing device 14 is fixedly connected with a printing head fixing plate 1421. The printing head fixing plate 1421 is movably connected with the ribbon bracket 2. The printing roller 143 is supported by the base 3, and can rotate around an axis of the printing roller 143. When the ribbon bracket 2 is closed relative to the base 3, the printing head 142 and the printing roller 143 are tangent in the printing passage. Positions of tangent lines of the printing head 142 and the printing roller 143 in the printing passage are printing positions of the printing head 142.

The ribbon dispensing shaft 151 and the ribbon rewinding shaft 152 of the ribbon rewinding and dispensing device 15 are located at one side of the ribbon bracket 2 away from the printing head 142, and are supported by the ribbon bracket 2. When the ribbon bracket 2 is closed relative to the base 3, axes of the ribbon dispensing shaft 151 and the ribbon rewinding shaft 152 are parallel to an axis of the printing roller 143.

When the ribbon 20 is installed, the ribbon bracket 2 is opened relative to the base 3. An unused ribbon spool is supported by the ribbon dispensing shaft 151, and a starting end of the ribbon 20 is pulled so that the ribbon 20 is wound on the ribbon rewinding shaft 152 after getting around the printing head 142. A paper scroll 30 is supported by a paper scroll supporting shaft 31. The printing paper 21 is led away from the paper scroll 30 and is covered on the surface of the printing roller 143. After the ribbon bracket 2 is closed relative to the base 3, the printing paper 21 is located between the ribbon 20 and the printing roller 143 and the ink layer of the ribbon 20 comes into contact with the printing paper 21.

During printing, the printing paper motor 1442 rotates to drive the printing roller 143 and the printing paper driving roller 1443 to rotate forward (clockwise direction in FIG. 3) so that the printing paper 21 moves downstream (in a direction shown by an arrow 40 in the figure). The ribbon dispensing motor 1532 drives the ribbon dispensing shaft 151 to rotate and the ribbon rewinding motor 1534 drives the ribbon rewinding shaft 152 to rotate so that the ribbon 20 is transmitted to the ribbon rewinding shaft 152 from the ribbon dispensing shaft 151. The heating bodies of the printing head 142 are controlled to emit heat so that the dye on the ink layer of the ribbon 20 is transferred to the printing paper 21, thereby forming a set image.

The cam motor 163 of the printing head lifting and pressing device 16 is fixedly connected with the base 3. The cam 161 is in transmission connection with the cam motor 163, and is matched with the printing head fixing plate 1421. When the cam motor 163 drives the cam 161 to rotate by different set angles, the printing head fixing plate 1421 is driven to move relative to the ribbon bracket 2 through change of matched positions of the cam 161 and the printing head fixing plate 1421, so that the printing head 142 is located in a lifted position or a pressed position. When the printing head 142 is located in the pressed position, the printing head 142 is tangently matched with the printing roller 143. When the printing head 142 is located in the lifted position, the printing head 142 is separated from the printing roller 143.

Figure 4:
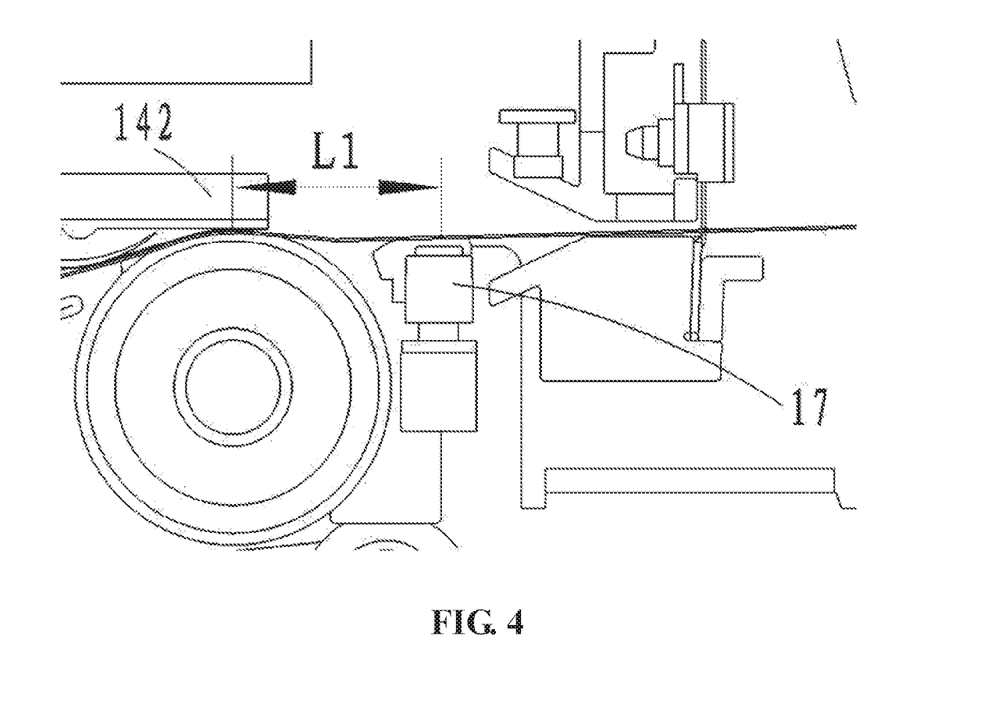
FIG. 4 is a local amplified structural schematic diagram illustrating a thermal transfer printer according to the first embodiment of the present disclosure.

FIG. 4 is a local amplified structural schematic diagram illustrating a thermal transfer printer according to the first embodiment of the present disclosure. As shown in the figure, along the printing paper transmitting direction, the mark sensor 17 is located downstream of the printing head 142 and a distance between the detection position of the mark sensor 17 and the printing position of the printing head 142 is L1.

Figure 5A:
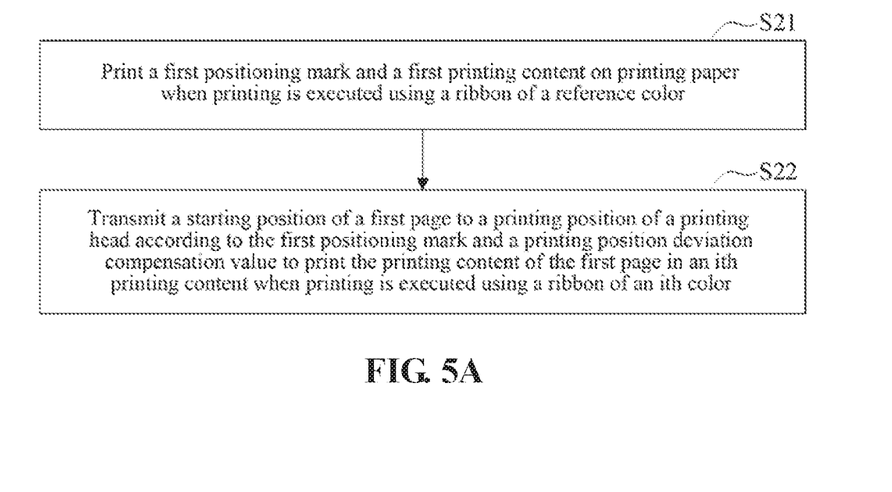
FIG. 5A is a flow chart illustrating a control method of a thermal transfer printer according to the first embodiment of the present disclosure.

FIG. 5A is a flow chart illustrating a control method of a thermal transfer printer according to the first embodiment of the present disclosure. As shown in the figure, the method includes the following steps:

S21: a first positioning mark and a first printing content are printed on printing paper when printing is executed using a ribbon of a reference color.

Contents of one or more pages are printed on the printing paper. The first positioning mark is used for marking a position of a first page on the printing paper. The first page is any page printed on the printing paper. The first printing content is a content printed by using the ribbon of the reference color.

After a ribbon of a reference color is installed on the printer, the first positioning mark and the first printing content are printed on printing paper when printing is executed using a ribbon of a reference color.

The printer in embodiments of the present disclosure includes a printing head configured to execute printing on the printing paper, a printing paper driving assembly configured to drive the printing paper to move in a printing passage, and a mark sensor configured to detect a positioning mark on the printing paper. When the printing head executes printing using a ribbon of a reference color, a first positioning mark and a first printing content are printed on printing paper.

S22: a starting position of the first page is transmitted to a printing position of the printing head according to the first positioning mark and a printing position deviation compensation value to print the printing content of the first page in an ith printing content when printing is executed using the ribbon of an ith color.

The printing position deviation compensation value is a distance between the starting position of the first positioning mark when the mark sensor detects that the first positioning mark reaches the detection position of the mark sensor and the detection position of the mark sensor. The ith color is a color except the reference color, and the ith printing content is printed by using the ribbon of the ith color.

The printing position deviation compensation value may be obtained through the printing position correcting method in embodiments of the present disclosure, and may also be prestored. The printing position deviation compensation value may read from a RAM 12, and may also read from a flash memory 13 before the starting position of the first page is transmitted to the printing position of the printing head according to the first positioning mark and the printing position deviation compensation value.

After the ribbon of the ith color is installed on the printer, the ribbon of the ith color can be used for printing. When the ribbon of the ith color is used for printing, at first the first positioning mark on the printing paper is detected, then the starting position of the first page is transmitted to the printing position of the printing head according to the first positioning mark and the printing position deviation compensation value to print the printing content of the first page in the ith printing content.

When the printing head uses the ribbon of the ith color to execute printing, at first the printing position deviation compensation value is acquired and the first positioning mark is detected through the mark sensor; then the printing paper driving assembly is controlled to transmit the starting position of the first page to the printing position of the printing head according to the first positioning mark and the printing position deviation compensation value, and the printing head is controlled to print the printing content of the first page in the ith printing content on the first page of the printing paper.

The distance between the detection position of the mark sensor and the printing position of the printing head is a first distance L1, and the printing position deviation compensation value is H. When the starting position of the first page is transmitted to the printing position of the printing head according to the first positioning mark and the printing position deviation compensation value, it is firstly detected whether the first positioning mark reaches the detection position of the mark sensor; and then the printing paper is controlled to move by a distance of L1+H along a first direction if the mark sensor detects that the first positioning mark reaches the detection position of the mark sensor, thereby confirming that the starting position of the first page is transmitted to the printing position of the printing head, wherein the first direction is a direction from the mark sensor to the printing head.

In the present embodiment, when printing is executed using the ribbon of an ith color, the starting position of the first page is transmitted to the printing position of the printing head according to the first positioning mark and the printing position deviation compensation value, and then the printing content of the first page in an ith printing content is printed, thereby enhancing accuracy of image overprinting when the color page is printed.

Figure 5B:
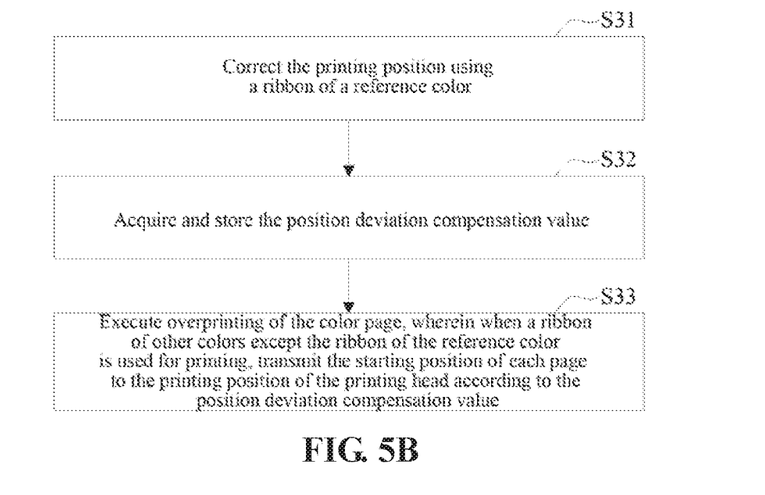
FIG. 5B is a flow chart illustrating a control method of a thermal transfer printer according to a second embodiment of the present disclosure.

FIG. 5B is a flow chart illustrating a control method of a thermal transfer printer according to a second embodiment of the present disclosure, which can be an optional embodiment of the embodiment shown in FIG. 5A. As shown in FIG. 5B, the method in the present embodiment includes the following steps:

S31: the printing position is corrected using a ribbon of a reference color.

Before the step is executed, the user installs the a single-color ribbon of the reference color on the printer, and installs a paper scroll wound with blank printing paper to a printing paper supporting mechanism. A front end (i.e., a paper head) of the printing paper is pulled so that the paper head is unfolded in the printing passage through the printing head and the mark sensor after being led away from the paper scroll. The user presses the ribbon bracket so that the ribbon bracket is closed relative to the base, and then the printer can use the ribbon of the reference color to execute the correction for the printing position in the step.

Figure 6:
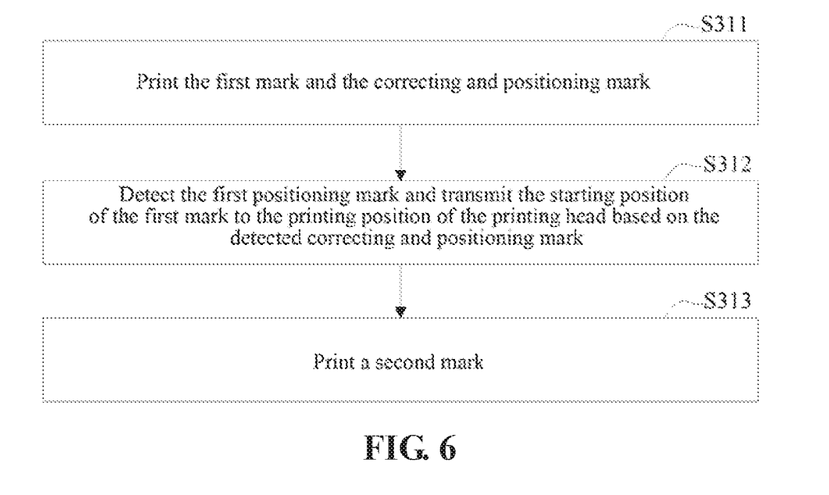
FIG. 6 is a flow chart illustrating a printing position correcting method of a thermal transfer printer according to embodiments of the present disclosure.

As shown in FIG. 6, the printing position correcting method includes the following steps:

S311: the first mark and the correcting and positioning mark are printed.

The controller controls the printing head lifting and pressing device to press the printing head so that the printing head is matched with the printing roller, and controls the printing device to print the first mark and the correcting and positioning mark on the printing paper, wherein the correcting and positioning mark corresponds to the position of the mark sensor, when the printing paper is transmitted in the printing passage, the correcting and positioning mark passes through the mark sensor, and a distance between the starting position of the first mark and a starting position of the correcting and positioning mark on the printing paper is a second distance L2. The correcting and positioning mark is a positioning mark printed on the printing paper when the correction of the printing position is executed.

Figure 7:
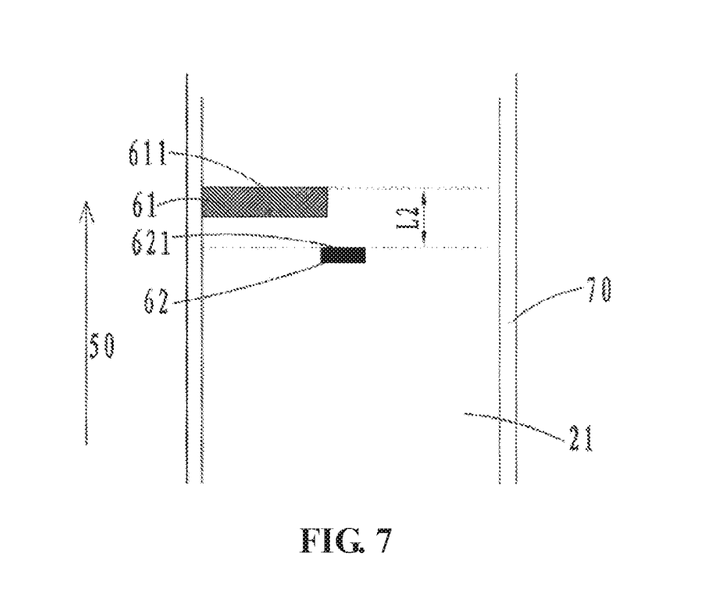
FIG. 7 is a schematic diagram illustrating a printing mode of a first mark and a first positioning mark according to embodiments of the present disclosure.

FIG. 7 is a schematic diagram illustrating a printing mode of a first mark and a correcting and positioning mark according to an embodiment of the present disclosure. As shown in the figure, when printing is executed, the printing paper 21 is fed in the printing passage 70 along a direction shown by an arrow 50. The first mark 61 is a gray scale block, and is located at a first side of the printing paper 21. Optionally, the first side is a left side of the printing paper. Along a paper feeding direction of the printing paper, the correcting and positioning mark 62 is located on the printing paper behind the first mark 61. The distance between the starting position 611 of the first mark 61 and the starting position 621 of the correcting and positioning mark 62 on the printing paper is a second distance L2.

S312: the correcting and positioning mark is detected and the starting position of the first mark is transmitted to the printing position of the printing head based on the detected correcting and positioning mark.

The controller controls the printing paper driving assembly to drive the feeding of the printing paper, and in the feeding process of the printing paper, the controller detects the correcting and positioning mark and transmits the starting position 611 of the first mark to the printing position of the printing head based on the detected correcting and positioning mark. Specifically, the controller controls the printing head lifting and pressing device to lift the printing head so that the printing head is separated from the printing roller. The controller controls the printing paper driving assembly to drive the feeding of the printing paper, and detects whether the correcting and positioning mark reaches the detection position of the mark sensor in the feeding process of the printing paper. The controller judges whether the correcting and positioning mark reaches the detection position of the mark sensor by comparing a detection signal outputted by the mark sensor with the first preset threshold T1. For example, when the detection signal outputted by the mark sensor is greater than the first preset threshold T1, the controller determines that the correcting and positioning mark is not located in the detection position of the mark sensor. When the detection signal outputted by the mark sensor is less than the first preset threshold T1, the controller determines that the correcting and positioning mark is located in the detection position of the mark sensor. When the detection signal outputted by the mark sensor is equal to the first preset threshold T1, the controller determines that the correcting and positioning mark reaches the detection position of the mark sensor. At this moment, the controller controls the printing paper driving assembly to stop driving the feeding of the printing paper, and controls the printing paper driving assembly to drive the printing paper to move back. In the moving process of the printing paper, the controller records a movement distance of the printing paper. The controller controls the printing paper driving assembly to stop driving the printing paper to move back when recording that the movement distance of the printing paper is a sum of the first distance L1 and the second distance L2. At this moment, the controller controls the printing head lifting and pressing device to press the printing head so that the printing head is matched with the printing roller.

Figure 8A:
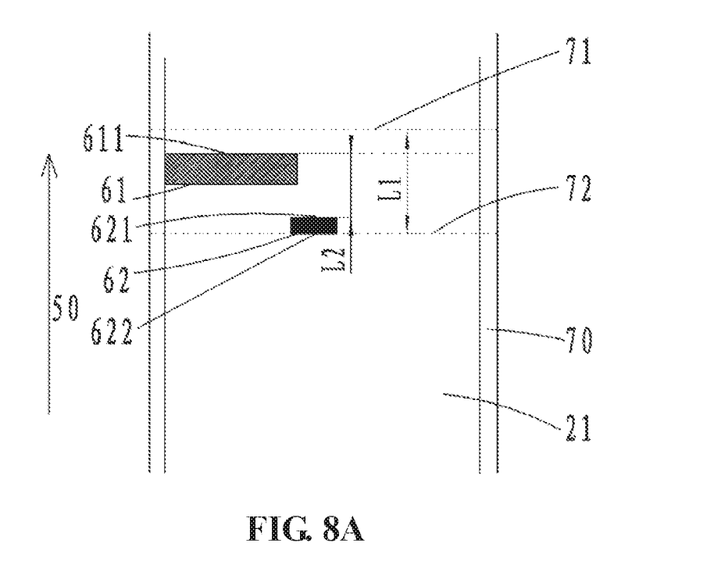
FIG. 8A to FIG. 8C are schematic diagrams illustrating theoretical conditions of position change of printing paper in a printing passage after the first mark and the first positioning mark are printed according to embodiments of the present disclosure.
Figure 8B:
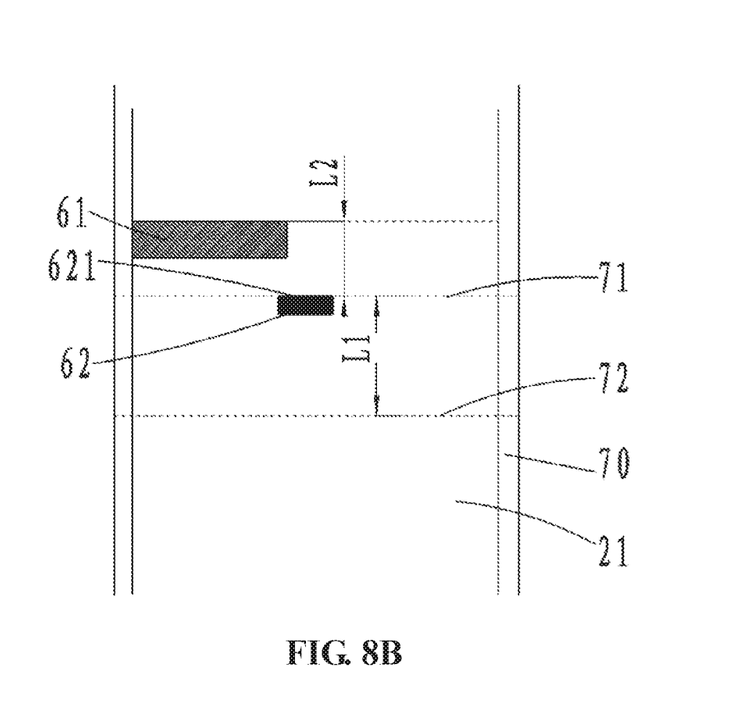
Figure 8C:
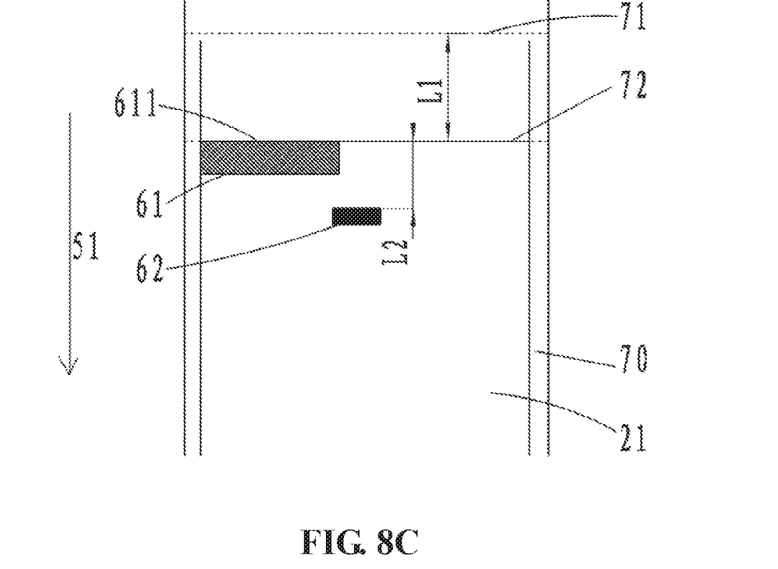

FIG. 8A to FIG. 8C are schematic diagrams illustrating theoretical conditions of position change of the printing paper in the printing passage after the first mark and the correcting and positioning mark are printed according to embodiments of the present disclosure. As shown in the figures, along the paper feeding direction of the printing paper 21 (the direction shown by an arrow 50), the detection position 71 of the mark sensor is located downstream of the printing position 72 of the printing head, and the distance between the detection position 71 and the printing position 72 is the first distance L1. In the process of the printing executed by the printer, the printing paper 21 moves in the printing passage 70. As shown in FIG. 8A, after the printer executes printing of the correcting and positioning mark 62 in step S311, an end position 622 of the correcting and positioning mark 62 is located in the printing position 72 of the printing head. The printing paper driving assembly drives the feeding of the printing paper, and the printing paper 21 moves in the printing passage 70 along the direction shown by the arrow 50. When the controllers determines that the correcting and positioning mark 62 reaches the detection position 71 of the mark sensor, the starting position 621 of the correcting and positioning mark 62 is theoretically located in the detection position 71 of the mark sensor as shown in FIG. 8B. At this moment, the controller controls the printing paper driving assembly to stop driving the feeding of the printing paper, and controls the printing paper driving assembly to drive the printing paper to move back. As shown in FIG. 8C, the printing paper 21 moves in the printing passage 70 along the direction shown by an arrow 51. As mentioned above, the first distance L1 is a distance between the printing position 72 of the printing head and the detection position 71 of the mark sensor, and the second distance L2 is a distance between the starting position 611 of the first mark 61 and the starting position 621 of the correcting and positioning mark on the printing paper. Therefore, when a moving distance of the printing paper is equal to a sum of the first distance L1 and the second distance L2, the starting position 611 of the first mark 61 is theoretically located in the printing position 72 of the printing head as shown in FIG. 8C.

S313: a second mark is printed.

Figure 9:
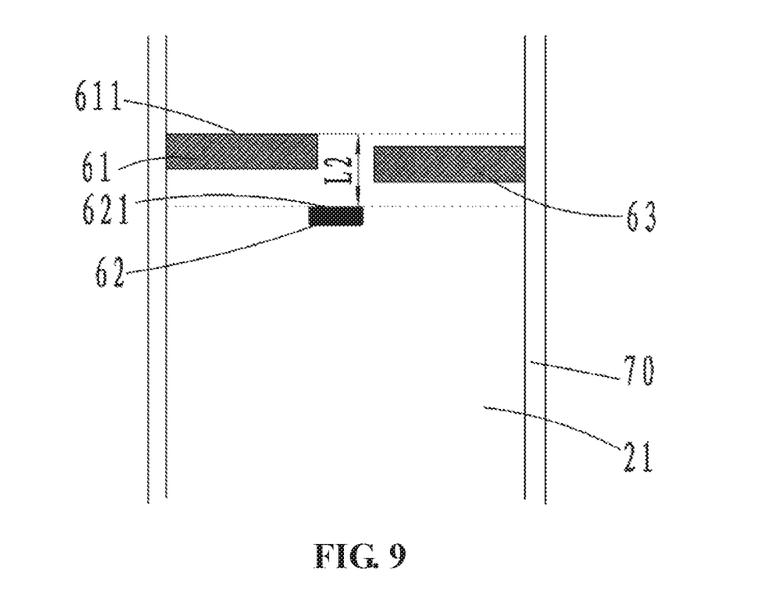
FIG. 9 is a schematic diagram illustrating a printing mode of a second mark, the first mark and the first positioning mark according to embodiments of the present disclosure.

The controller controls the printing device to print the second mark on the printing paper. FIG. 9 is a schematic diagram illustrating a printing mode of a second mark, a first mark and a correcting and positioning mark according to embodiments of the present disclosure. As shown in the figure, the second mark 63 is a gray scale block, and is located at a second side of the printing paper 21. Optionally, the second side is a right side of the printing paper.

It can be known from FIG. 8A to FIG. 8C that in the feeding process of the printing paper driven by the printing paper driving assembly, when the starting position of the correcting and positioning mark reaches the detection position of the mark sensor, if the controller can immediately determine that the correcting and positioning mark reaches the detection position of the mark sensor, i.e., the value of the detection signal outputted by the mark sensor can immediately reach the first preset threshold T1, the starting position of the first mark on the printing paper reaches the printing position of the printing head when the printing paper driving assembly drives the printing paper to move back by the sum of the first distance L1 and the second distance L2. After the printing device prints the second mark, the starting position of the second mark is the same as the starting position of the first mark, i.e., a spacing distance between the first mark and the second mark along the printing paper transmitting direction is zero. However, it can be known from FIG. 1 that, it takes some time from a moment that the starting position of the correcting and positioning mark reaches the detection position of the mark sensor to a moment that the detection signal outputted by the mark sensor reaches the first preset threshold T1. Therefore, in practical cases, the spacing distance between the first mark and the second mark along the printing paper transmitting direction is not zero.

Figure 10:
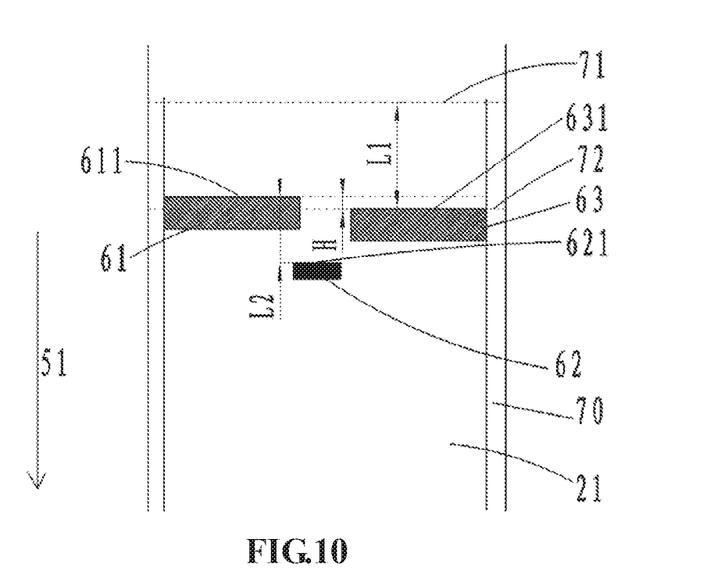
FIG. 10 is a schematic diagram illustrating practical relative positions of the first mark and the second mark according to embodiments of the present disclosure.

FIG. 10 is a schematic diagram illustrating practical relative positions of the first mark and the second mark according to an embodiment of the present disclosure. The starting position 621 of the correcting and positioning mark 62 already passes through the detection position 71 of the mark sensor when the controller determines that the correcting and positioning mark 62 reaches the detection position 71 of the mark sensor, then the printing paper driving assembly drives the printing paper to move back and the printing paper 21 moves in the printing passage 70 along the direction shown by the arrow 51. The starting position 611 of the first mark 61 does not reach the printing position 72 of the printing head when the moving distance of the printing paper reaches the sum of the first distance L1 and the second distance L2. At this moment, as shown in FIG. 10, after the printing device prints the second mark 63, a certain spacing distance H exists between the starting position 631 of the second mark 63 and the starting position 611 of the first mark 61 along the printing paper transmitting direction. When the starting position of the correcting and positioning mark reaches the detection position of the mark sensor, if the controller can immediately determine that the correcting and positioning mark reaches the detection position of the mark sensor, the starting position 611 of the first mark 61 just reaches the printing position 72 of the printing head when the moving distance of the printing paper reaches the sum of the first distance L1 and the second distance L2, i.e., the value of the spacing distance H in this case is zero. Therefore, the spacing distance H is caused by that the starting position of the correcting and positioning mark already passes through the detection position of the mark sensor when the controller determines that the correcting and positioning mark reaches the detection position of the mark sensor. It can be known from FIG. 8A to FIG. 8C and FIG. 10 that, the value of the distance H actually is a distance between the starting position of the correcting and positioning mark when the controller determines that the correcting and positioning mark reaches the detection position of the mark sensor and the detection position of the mark sensor.

S32: the position deviation compensation value is acquired and stored.

The printer acquires the spacing distance between the first mark and the second mark along the printing paper transmitting direction and stores the spacing distance the value in the flash memory as the position deviation compensation value. The user of the printer can obtain the spacing distance between the first mark and the second mark along the printing paper transmitting direction through a manual measurement method, and can also obtain the spacing distance through analysis calculation of a computer according to a printed image on the printing paper collected by an image collecting device. The user of the printer sends the spacing distance between the first mark and the second mark along the printing paper transmitting direction to the printer through the communication device.

It shall be noted that the printing mode of the first mark, the second mark and the correcting and positioning mark is not limited to the method described in the present embodiment during correction of the printing position. Optionally, the correcting and positioning mark can be directly used as the first mark. After controlling the printing device to print the correcting and positioning mark, the controller controls the printing paper driving assembly to drive the feeding of the printing paper. After determining that the correcting and positioning mark reaches the detection position of the mark sensor, the controller controls the printing paper driving assembly to drive the printing paper to move back, transmits the starting position of the correcting and positioning mark to the printing position of the printing head, and then prints the second mark. When the correcting and positioning mark is directly used as the first mark, the value of L2 is zero.

S33: overprinting of the color page is executed, wherein when a ribbon of other colors except the ribbon of the reference color is used for printing, the starting position of each page is transmitted to the printing position of the printing head according to the position deviation compensation value.

The printer successively uses single-color ribbons of different colors to print images of color pages. When a control command of executing printing using the ribbon of the reference color is received, the positioning mark and the first printing content are printed on the printing paper. When a control command of executing printing using the ribbon of the ith color is received, the positioning mark printed on the printing paper is detected, the starting position of each page is transmitted to the printing position of the printing head based on the detected positioning mark of each page and the position deviation compensation value, and the ith printing content is printed, wherein i is a positive integer and $2 \leq i \leq N$, and N is a total number of color included in color pages to be printed. The first printing content is printed by using the ribbon of the reference color, and the ith printing content is printed by using the ribbon of the ith color.

Optionally, when a control command of executing printing using the ribbon of the reference color is received, the controller determines the starting position of each page to be printed by recording the movement distance of the printing paper, uses the ribbon of the reference color to print the positioning mark on the starting position of each page and prints a set image in each page. When a control command of executing printing using the ribbon of the ith color is received, before the image of each page is printed, the controller firstly transmits the starting position of each page, i.e., the starting position of the positioning mark on the printing paper, to the detection position of the mark sensor by detecting the detection signal outputted by the mark sensor. Then the controller controls the printing paper driving assembly to drive the printing paper to move back for a distance of (L1+H), and transmits the starting position of each page to the printing position of the printing head. Finally, the controller controls the printing device to print a set image in the page. The starting position of the positioning mark already passes through the detection position of the mark sensor when the controller determines that the positioning mark reaches the detection position of the mark sensor, and the distance between the starting position and the detection position is H. Therefore, after driving the printing paper moving the distance of (L1+H), the starting position of the positioning mark just reaches the printing position of the printing head. When the ribbon of the ith color is used to print the set image in the page, the image printed by using the ribbon of the ith color and the image printed by using the ribbon of the reference color can be overprinted according to a predetermined position relationship.

It shall be noted that after the printing position is corrected and the position deviation compensation value is stored, whenever the printer uses one of the ribbons of N colors to execute image overprinting, if the ribbon of the reference color installed on the printer is not changed, the printer can directly acquire the stored position deviation compensation value from the flash memory to perform next image overprinting.

When different color pages are printed, the user may install ribbons of different colors as the ribbon of the reference color whenever executing image overprinting according to actual needs, causing the color of the printed positioning mark to be changed. Since the colors of the positioning marks are different, optical characteristics (transmittance or reflectivity) of the positioning marks are also different and electric signals outputted by the mark sensor when detecting the positioning mark are also different. Thus, when the positioning marks are printed by using the ribbons of different colors, time intervals between the moment that the starting position of the positioning mark reaches the detection position of the mark sensor and the moment that the controller of the printer determines that the positioning mark reaches the detection position of the mark sensor are different when the printer detects the positioning marks, causing that errors between the starting position of the page determined through the detected positioning mark and the starting position of the page determined when the ribbons of the reference colors are installed are different when the ribbons of the reference colors are different. Therefore, optionally, when the ribbons of the reference colors installed on the printer are changed, the printer executes the control method shown in FIG. 5B. The printer corrects the printing position by using the ribbons of the reference colors, acquires and stores the position deviation compensation value and overprints the color pages based on the acquired position deviation compensation value. In this way, overprinting accuracy of other colors can be realized regardless of the color used as the reference color.

In the thermal transfer printer and the control method thereof in embodiments of the present disclosure, prior to image overprinting, the printing position is corrected to acquire the position deviation compensation value by installing the ribbons of the reference colors. During image overprinting, when the ribbon of other colors is used for printing, the printing position is regulated based on the position deviation compensation value. Through the thermal transfer printer and the control method thereof in embodiments of the present disclosure, a problem of inaccurate image overprinting in a printer of a related technology when the color page is printed can be effectively solved.

The above only describes optional embodiments of the present disclosure, not intended to limit the present disclosure. For those skilled in the art, various modifications and changes can be made to the present disclosure.

What is claimed is:

1. A control method of a printer, comprising:
   printing a first positioning mark and a first printing content on printing paper when printing is executed using a ribbon of a reference color, wherein the first positioning mark is used for marking a position of a first page on the printing paper and the first printing content is printed by using the ribbon of the reference color; and
   firstly detecting the first positioning mark on the printing paper and then transmitting a starting position of the first page to a printing position of a printing head according to the first positioning mark and a printing position deviation compensation value to print the printing content of the first page in an ith printing content when printing is executed using a ribbon of an ith color;
   wherein the printer comprises a mark sensor for detecting a positioning mark on the printing paper and a printing head for executing printing on the printing paper; the printing position deviation compensation value is a distance between a starting position of the first positioning mark when the mark sensor detects that the first positioning mark reaches the detection position of the mark sensor and a detection position of the mark sensor; the ith color is a color except the reference color; and the ith printing content is printed by using the ribbon of the ith color.

2. The method according to claim 1, wherein a distance between the detection position of the mark sensor and the printing position of the printing head is a first distance L1, the printing position deviation compensation value is H, and a step of transmitting the starting position of the first page to the printing position of the printing head according to the first positioning mark and the printing position deviation compensation value comprises:
   detecting whether the first positioning mark reaches the detection position of the mark sensor in the transmitting process of the printing paper; and
   controlling the printing paper to move by a distance of L1+H along a first direction if the mark sensor detects that the first positioning mark reaches the detection position of the mark sensor, wherein the first direction is from the mark sensor to the printing head.

3. The method according to claim 1, wherein a distance between the detection position of the mark sensor and the printing position of the printing head is a first distance L1, and the printing position deviation compensation value is obtained through a following printing position correcting method:
   printing a first mark and a correcting and positioning mark on the printing paper after the ribbon of the reference color is installed on the printer, wherein a distance between a starting position of the first mark and a starting position of the correcting and positioning mark on the printing paper is a second distance L2;
   detecting the correcting and positioning mark and judging whether the correcting and positioning mark reaches the detection position of the mark sensor in a feeding process of the printing paper;
   controlling the printing paper to move back if judging the correcting and positioning mark reaches the detection position of the mark sensor, wherein a moving distance of the printing paper is a sum of the first distance L1 and the second distance L2;
   printing a second mark on the printing paper; and
   acquiring a spacing distance between the first mark and the second mark along a printing paper transmitting direction, and using the spacing distance as the printing position deviation compensation value.

4. The method according to claim 1, wherein a distance between the detection position of the mark sensor and the printing position of the printing head is a first distance L1, and the printing position deviation compensation value is obtained through a following printing position correcting method:
   printing a correcting and positioning mark on the printing paper when the ribbon of the reference color is installed on the printer;
   detecting the correcting and positioning mark and judging whether the correcting and positioning mark reaches the detection position of the mark sensor in a feeding process of the printing paper;
   controlling the printing paper to move back if judging the correcting and positioning mark reaches the detection position of the mark sensor, wherein a moving distance of the printing paper is the first distance L1;
   printing a second mark on the printing paper; and
   acquiring a spacing distance between the correcting and positioning mark and the second mark along a printing paper transmitting direction, and using the spacing distance as the printing position deviation compensation value.

5. The method according to claim 3, wherein the printer further comprises a memory for storing the printing position deviation compensation value; after the printing position deviation compensation value is obtained through the printing position correcting method, the printing position deviation compensation value is stored into the memory; when the printing position deviation compensation value is acquired, the method also comprises:
   judging whether the installed ribbon of the reference color on the printer is changed;
   re-correcting through the printing position correcting method to obtain the printing position deviation compensation value if judging the installed ribbon of the reference color on the printer is changed; and
   reading the printing position deviation compensation value from the memory if judging the installed ribbon of the reference color on the printer is not changed.

6. A printer, comprising:
   a printing head configured to execute printing on a printing paper;

a printing paper driving assembly configured to drive the printing paper to move in a printing passage;

a mark sensor configured to detect a positioning mark comprising a first positioning mark on the printing paper, wherein the first positioning mark is used for marking a position of a first page on the printing paper; and a controller configured to control the printing head to print the first positioning mark and a first printing content on the printing paper when the printing head is printing using a ribbon of a reference color, and firstly detect the first positioning mark through the mark sensor and then control the printing paper driving assembly to transmit a starting position of the first page to a printing position of the printing head according to the first positioning mark and a deviation compensation value printing position to control the printing head to print the printing content of the first page in an ith printing content when the printing head is printing using a ribbon of an ith color, wherein the first printing content is printed by using the ribbon of the reference color; the printing position deviation compensation value is a distance between a starting position of the first positioning mark when the mark sensor detects that the first positioning mark reaches the detection position of the mark sensor and a detection position of the mark sensor; the ith color is a color except the reference color; and the ith printing content is printed by using the ribbon of the ith color.

7. The printer according to claim 6, wherein a distance between the detection position of the mark sensor and the printing position of the printing head is a first distance L1; the printing position deviation compensation value is H; and the controller is configured to control the printing paper driving assembly to transmit the starting position of the first page to the printing position of the printing head according to the first positioning mark and the printing position deviation compensation value through a following method:

judging whether the first positioning mark reaches the detection position of the mark sensor according to a detection signal outputted by the mark sensor in the transmitting process of the printing paper; and controlling the printing paper driving assembly to drive the printing paper to move by a distance of L1+H along a first direction if the mark sensor judges that the first positioning mark reaches the detection position of the mark sensor, wherein the first direction is from the mark sensor to the printing head.

8. The printer according to claim 6, wherein a distance between the detection position of the mark sensor and the printing position of the printing head is a first distance L1; and the controller is also configured to obtain the printing position deviation compensation value through a following printing position correcting method: controlling the printing head to print a first mark and a correcting and positioning mark on the printing paper after the ribbon of the reference color is installed on the printer, wherein a distance between a starting position of the first mark and a starting position of the correcting and positioning mark on the printing paper is a second distance L2; detecting the correcting and positioning mark and judging whether the correcting and positioning mark reaches the detection position of the mark sensor through the mark sensor in a feeding process of the printing paper; controlling the printing paper driving assembly to drive the printing paper to move back if judging the correcting and positioning mark reaches the detection position of the mark sensor, wherein a moving distance of the printing paper is a sum of the first distance L1 and the second distance L2; controlling the printing head to print a second mark on the printing paper; and acquiring a spacing distance between the first mark and the second mark along a printing paper transmitting direction, and using the spacing distance as the printing position deviation compensation value.

9. The printer according to claim 6, wherein a distance between the detection position of the mark sensor and the printing position of the printing head is a first distance L1; and the controller is also configured to obtain the printing position deviation compensation value through a following printing position correcting method: controlling the printing head to print a correcting and positioning mark on the printing paper after the ribbon of the reference color is installed on the printer; detecting the correcting and positioning mark and judging whether the correcting and positioning mark reaches the detection position of the mark sensor through the mark sensor in a feeding process of the printing paper; controlling the printing paper driving assembly to drive the printing paper to move back if judging the correcting and positioning mark reaches the detection position of the mark sensor, wherein a moving distance of the printing paper is the first distance L1; controlling the printing head to print a second mark on the printing paper; and acquiring a spacing distance between the correcting and positioning mark and the second mark along a printing paper transmitting direction, and using the spacing distance as the printing position deviation compensation value.

10. The printer according to claim 8, wherein the printer further comprises a memory configured to store the printing position deviation compensation value obtained through the printing position correcting method; the controller is also configured to judge whether the installed ribbon of the reference color on the printer is changed, re-execute the printing position correcting method to obtain the printing position deviation compensation value if judging the installed ribbon of the reference color on the printer is changed, and read the printing position deviation compensation value from the memory if judging the installed ribbon of the reference color on the printer is not changed.

11. The method according to claim 4, wherein the printer further comprises a memory for storing the printing position deviation compensation value; after the printing position deviation compensation value is obtained through the printing position correcting method, the printing position deviation compensation value is stored into the memory; when the printing position deviation compensation value is acquired, the method also comprises:

judging whether the installed ribbon of the reference color on the printer is changed;

re-correcting through the printing position correcting method to obtain the printing position deviation compensation value if judging the installed ribbon of the reference color on the printer is changed; and reading the printing position deviation compensation value from the memory if judging the installed ribbon of the reference color on the printer is not changed.

12. The printer according to claim 9, wherein the printer further comprises a memory configured to store the printing position deviation compensation value through the printing position correcting method; the controller is also configured to judge whether the installed ribbon of the reference color on the printer is changed, re-correct through the printing position correcting method to obtain the printing position deviation compensation value if judging the installed ribbon of the reference color on the printer is changed, and read the printing position deviation compensation value from the memory if judging the installed ribbon of the reference color on the printer is not changed.

\* \* \* \* \*